US008209622B2

(12) United States Patent  (10) Patent No.: US 8,209,622 B2
Selig  (45) Date of Patent: Jun. 26, 2012

(54) DRAG AND DROP BROWSER EXTENSION

(75) Inventor: Roy A. Selig, Hillsborough, NJ (US)

(73) Assignee: Oracle International Corporation, Redwood Shore, CA (US)

( * ) Notice: Subject to any disclaimer, the term of this patent is extended or adjusted under 35 U.S.C. 154(b) by 880 days.

(21) Appl. No.: 11/978,874

(22) Filed: Oct. 30, 2007

(65) Prior Publication Data

US 2008/0184148 A1    Jul. 31, 2008

Related U.S. Application Data

(60) Provisional application No. 60/898,294, filed on Jan. 30, 2007.

(51) Int. Cl.
G06F 3/048 (2006.01)
(52) U.S. Cl. .................. 715/769; 709/219; 709/201
(58) Field of Classification Search ............... 707/102, 707/104, 200; 715/751
See application file for complete search history.

(56) References Cited

U.S. PATENT DOCUMENTS

| 5,367,673 | A | * | 11/1994 | Goldsmith et al. ........... 382/167 |
| 5,790,790 | A | * | 8/1998 | Smith et al. .................. 709/206 |
| 6,272,493 | B1 | | 8/2001 | Pasquali |
| 6,321,209 | B1 | | 11/2001 | Pasquali |
| 6,434,563 | B1 | | 8/2002 | Pasquali et al. |
| 6,535,882 | B2 | | 3/2003 | Pasquali |
| 6,636,856 | B2 | | 10/2003 | Pasquali |
| 6,658,419 | B2 | | 12/2003 | Pasquali |
| 6,751,618 | B1 | * | 6/2004 | Germscheid et al. .......... 1/1 |
| 6,918,066 | B2 | | 7/2005 | Dutta et al. |
| 7,085,736 | B2 | | 8/2006 | Keezer et al. |
| 7,089,237 | B2 | | 8/2006 | Turnbull et al. |
| 7,107,264 | B2 | | 9/2006 | Lu |
| 7,127,501 | B1 | * | 10/2006 | Beir et al. .................... 709/219 |
| 2003/0132967 | A1 | * | 7/2003 | Gangadharan ............... 345/769 |
| 2004/0165007 | A1 | | 8/2004 | Shafron |
| 2004/0205633 | A1 | | 10/2004 | Martinez et al. |
| 2005/0039144 | A1 | | 2/2005 | Wada et al. |
| 2006/0031784 | A1 | * | 2/2006 | Makela ......................... 715/850 |
| 2006/0059434 | A1 | | 3/2006 | Boss et al. |
| 2006/0069617 | A1 | | 3/2006 | Milener et al. |
| 2006/0129631 | A1 | * | 6/2006 | Na et al. ....................... 709/203 |
| 2006/0143568 | A1 | | 6/2006 | Milener et al. |
| 2006/0179404 | A1 | | 8/2006 | Yolleck et al. |
| 2006/0184578 | A1 | | 8/2006 | La Rotonda et al. |
| 2006/0184997 | A1 | | 8/2006 | La Rotonda et al. |

(Continued)

OTHER PUBLICATIONS

Wikipedia; Dashboard (software); www.en.wikipedia.com; Apr. 29, 2005; pp. 1-7.

(Continued)

Primary Examiner — Tuyetlien Tran
Assistant Examiner — Peiyong Weng
(74) Attorney, Agent, or Firm — Kraguljac Law Group LLC

(57) ABSTRACT

Methods and other embodiments associated with a browser extension are described. One example browser extension includes a drag logic to identity an item to be uploaded from a local source to a remote destination. The browser extension may also include a drop logic to identify the remote destination. The browser extension may also include an upload logic to control the upload from the local source to the remote destination in response to the local item being dragged from a first graphical user interface (GUI) element associated with the browser and dropped on a second GUI element associated with the browser. The second GUI element may be managed, at least in part, by the browser extension.

19 Claims, 8 Drawing Sheets

U.S. PATENT DOCUMENTS

2006/0224951 A1    10/2006  Burke et al.
2006/0259588 A1*   11/2006  Lerman et al. ................ 709/219
2007/0101298 A1     5/2007  Yolleck et al.
2007/0183741 A1*    8/2007  Lerman et al. .................. 386/54
2007/0250531 A1*   10/2007  Wiggins et al. ............... 707/102

OTHER PUBLICATIONS

Wikipedia; Windows Sidebar; www.en.wikipedia.org; Nov. 8, 2006; pp. 1-3.

King, Brian; What is Firefox, Published on O'Reilly Network; http://www.oreillynet.com; Sep. 26, 2005; pp. 1-7.

Xulplanet; Xul Tutorial, Ch. 4.5: Content Panels (pp. 1-3) www.xulplanet.com/tutorials/xultu; Feb. 19, 2006.

Microsoft Corp.; Browse, Shop & Search Multiple Websites at Once; http://www.microsoft.com/windows/ie/ie7/tour/fre/tabs/how.html; Apr. 2007; p. 1.

Microsoft Corp.; Windows Help and How-To; Windows Vista Help: Using Quick Tabs in Internet Explorer; http://windowshelp.microsoft.com/04/07; p. 1-2.

* cited by examiner

DRAG AND DROP BROWSER EXTENSION

CROSS REFERENCE TO RELATED APPLICATIONS

This application claims the benefit of U.S. Provisional Application Ser. No. 60/898,294 filed Jan. 30, 2007, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional browsers may require the use of antiquated file upload controls to move files from a local machine running a browser to a remote machine supporting an online file management system. For example, file uploads that are done through conventional browsers are performed by a native browser control. This browser control typically includes a text field for entering a path and filename, and an associated browse button. Clicking the browse button launches an operating system file explorer window from which a user can pick a file. After selecting the file, a button (e.g., "OK" button) may need to be clicked in a secondary dialog box. This second action causes the full file path to be dropped into the text field. Then, yet another button (e.g., "upload" button) may need to be clicked to confirm the upload to a target repository. This approach may be cumbersome and different from a more natural drag and drop experience.

Conventional web browsers may have provided a sub-optimal experience with respect to uploading files from a local source to a remote server. Limitations associated with this type of process may have required multiple user actions to upload a file and may also have lead to security and incompletion issues. Conventional systems may also have obscured screen real estate associated with enterprise applications. This real estate may have been better employed in displaying output associated with an enterprise application than with standard browser functionality associated with uploading a file. An enterprise application may include software hosted on an application server that provides services to users belonging to an enterprise. These users may have an enhanced enterprise application experience by interacting with specific browser chrome and/or specific enterprise application content in specific ways. However, a conventional web browser may have required applications, including enterprise applications, to deliver content and functionality in a browser window using only certain techniques (e.g., hypertext markup language (HTML)), and may also have controlled the nature, quantity, and location of available chrome. While providing an open, generic, global approach to content delivery and chrome management, this requirement may have limited the richness of possible interactions between web browsers and enterprise applications.

A web browser extension is a code package that can be installed into a browser and/or client device (e.g., computer) running a browser. The extension may add a new feature to a browser, extend an existing functionality, modify a visual theme, and so on. This browser may employ an extensible markup language (XML) user-interface language (XUL, pronounced zuul) to describe and support application user interfaces. XUL provides an overlay functionality that facilitates merging user interfaces from different sources into one user interface (UI). For example, UI from a browser and a browser extension(s) may be merged. Recall that a browser extension may provide additional functionality for a browser. This functionality may include, for example, additional UI features that facilitate customizing a browser UI.

The collective UI adornment for a browser (e.g., border, menus, frames, buttons, scrollbars) may be referred to as "browser chrome" or just "chrome". A browser extension may interact with the browser chrome. A browser extension may include a XUL file(s), JavaScript, a style sheet(s), an image(s), and so on. This set of items may be loaded into a single package (e.g., Zip file). The package may be loaded into, unwrapped by, and installed on a client device associated with a browser. Once installed, package components may be operably connected to a browser and/or browser object(s) using the XUL overlay feature. Though added to a browser, browser extension code may remain separate and removable. An extension may reside in a browser and/or client device rather than being part of a web page transmitted by a web service (e.g., enterprise application) to the browser and/or client. Thus, conventional systems may employ functionality (e.g., XUL) to facilitate enhancing web browsers via web browser extensions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

In one embodiment, a browser extension is provided that provides a drag and drop upload functionality that facilitates uploading files from a local source to a remote target destination using a single (e.g., drag and drop) action instead of multiple user interactions associated with a traditional browser file selection dialog. The browser extension may be embodied as software and delivered as part of an Enterprise Web Browser Extension or as part of a separate upload extension. Once installed on a client device, the browser extension may logically and/or physically become part of a browser and thus the upload functionality may become part of the browser functionality. This facilitates removing interaction with an operating system "file browse" dialog and secondary dialogs to find and then upload files.

In one example, the browser extension is configured to control acceptance of local content into a web-based file management system through drag-and-drop into a specialized web-browser pane. With this feature, the file upload process can be simplified to a single user action. In one embodiment, the browser extension is configured to control creation of a browser pane to receive drop events. The receiving pane is configured to recognize drop events and to respond to drop events. For example, the receiving pane may be configured to recognize that a drop event concerns a file being dragged and dropped from a local source. In response to such a drop event, the browser extension may cause information associated with the dropped file(s) to be captured. The captured information may then be used to transmit the dropped file(s) from the local source to a remote target (e.g., server). Note that unlike conventional systems that required at least two user actions, the browser extension facilitates performing an upload from a local source to a remote destination in response to one user gesture (e.g. one drag-and-drop gesture).

Figure 1:
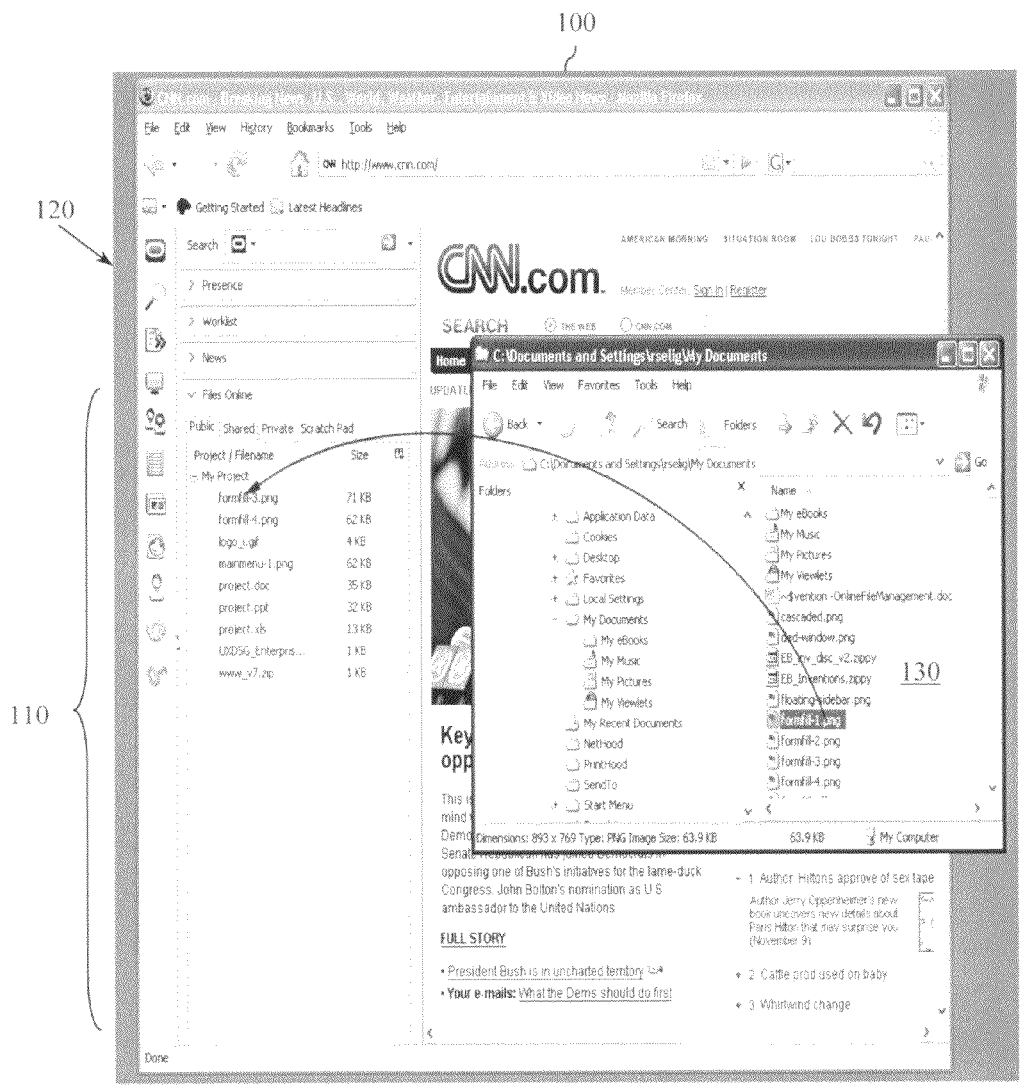
FIG. 1 is a simulated screen shot of a drag and drop upload action performed by a browser having an associated sidebar managed, at least in part, by a browser extension.

In one embodiment, a browser extension may create a "files online" pane (e.g. in a sidebar pane) that represents an online file system (e.g. file system on the server-side) accessible to a user. In the files online pane, a tree-structure of a hierarchical online file management system may be displayed. The tree-structure may illustrate nodes representing storage devices, directories/folders, sub-directories/sub-folders, files, and so on. These nodes may be targets for a drop event. FIG. 1 illustrates a simulated screen shot 100 that includes a "Files Online" pane 110 in a sidebar 120. The pane 110 illustrates a directory of "My Project." This directory may be a target for a drop event. For example, files may be selected from a local source hierarchy illustrated in window 130. The selected file may then be dragged onto a node in pane 110 and dropped.

The browser extension may provide functionality to respond to and to recognize drop events that occur in the pane 110. When a drop event occurs, the browser extension may provide functionality to detect and determine the target (e.g. target folder, target file, target device) of the drop. To facilitate uploading from the local source to the target destination, information may be obtained about the dropped item (e.g., file, folder).

In one embodiment, a browser extension may provide functionality for a process where a user selects an item (e.g., file, files, folder, folders) from a local source location on a client device. The local source may be, for example, a desktop, a windows explorer, a fax finder window, and so on. While three sources are described, it is to be appreciated that the item associated with the local source may come from a variety of sources. The selected item(s) may be dragged into the online files pane displayed in the browser window. In one example, the files pane may be presented as part of a sidebar associated with the browser window.

The dragging and dropping gesture will cause the acquisition of at least two sets of information. A first set of information concerns the item being dropped while a second set of information concerns the item being dropped on. The sets of information may include, for example, file identifiers, pointers, addresses, names, fully qualified path names, globally unique identifiers (GUID), and so on. With the two sets of information in hand, file uploading may be initiated. The upload will cause the dropped item (local item) to be copied to the dropped upon item (remote destination). For example, when the dropped item is a file, the drag and drop operation will cause the file to be copied to the identified target location (e.g., file, folder, device) in the online file system. Thus, the upload process occurs from one gesture or action from the user, dragging and dropping an item.

Figure 2:
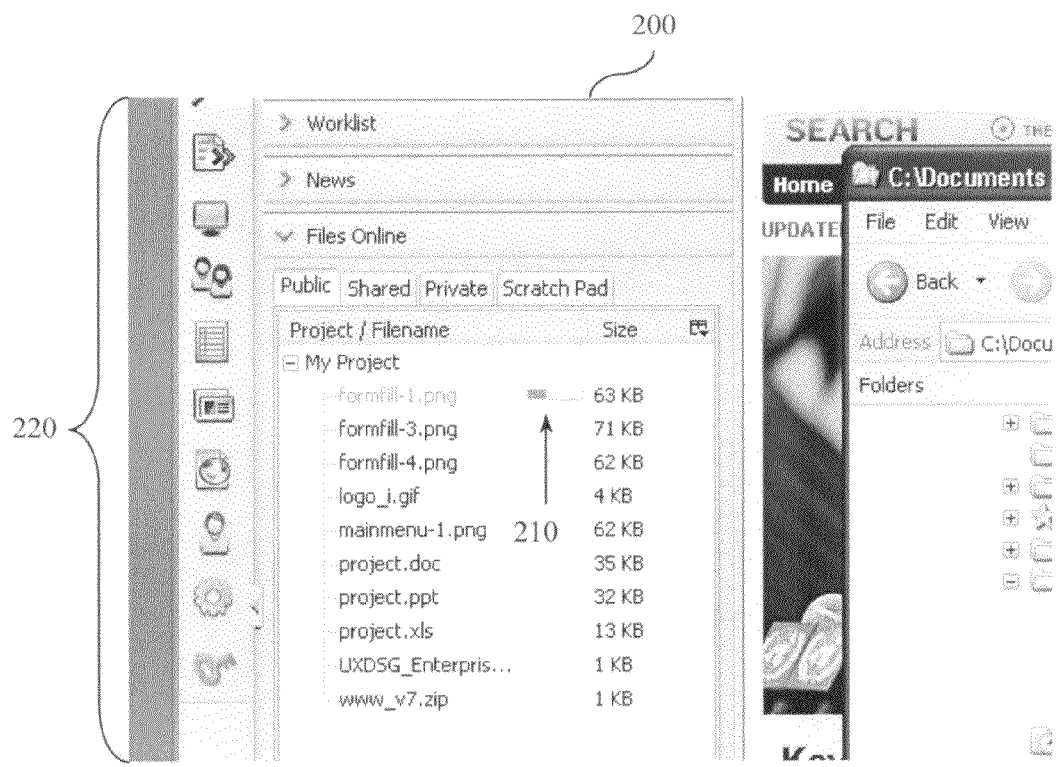
FIG. 2 is a simulated screen shot of a portion of a browser window associated with a drag and drop upload action performed by a browser having an associated sidebar managed, at least in part, by a browser extension.

In one embodiment, the browser extension can cause the display of a status bar that indicates the process and progress of the upload. The status bar may be placed, for example, next to the target tree node. It will be appreciated that due to latencies between networks, uploads are not instantaneous. Thus, the status bar can help to show the progress of the upload. FIG. 2 illustrates a simulated screen shot 200 of a portion of a browser window. The window includes a sidebar 220 from which a client side visual stub representing where in a server side system an uploaded file will appear. The stub includes a progress bar 210.

Figure 4:
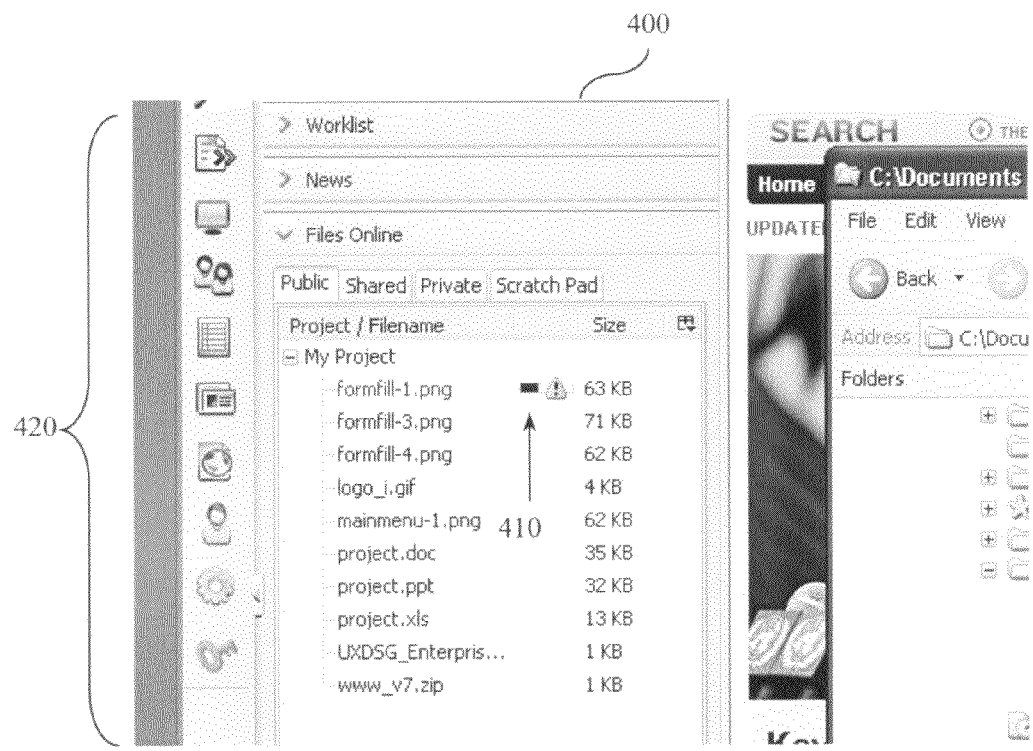
FIG. 4 is a simulated screen shot of an upload failure indicator.

In some cases an upload may fail, thus FIG. 4 illustrates a simulated screen shot 400 of a browser window that includes a sidebar 420 from which a client-side stub has been revealed. The client side stub includes an error icon 410. In one example, clicking on or otherwise activating the error icon 410 may cause more information about the error to be displayed.

Figure 3:
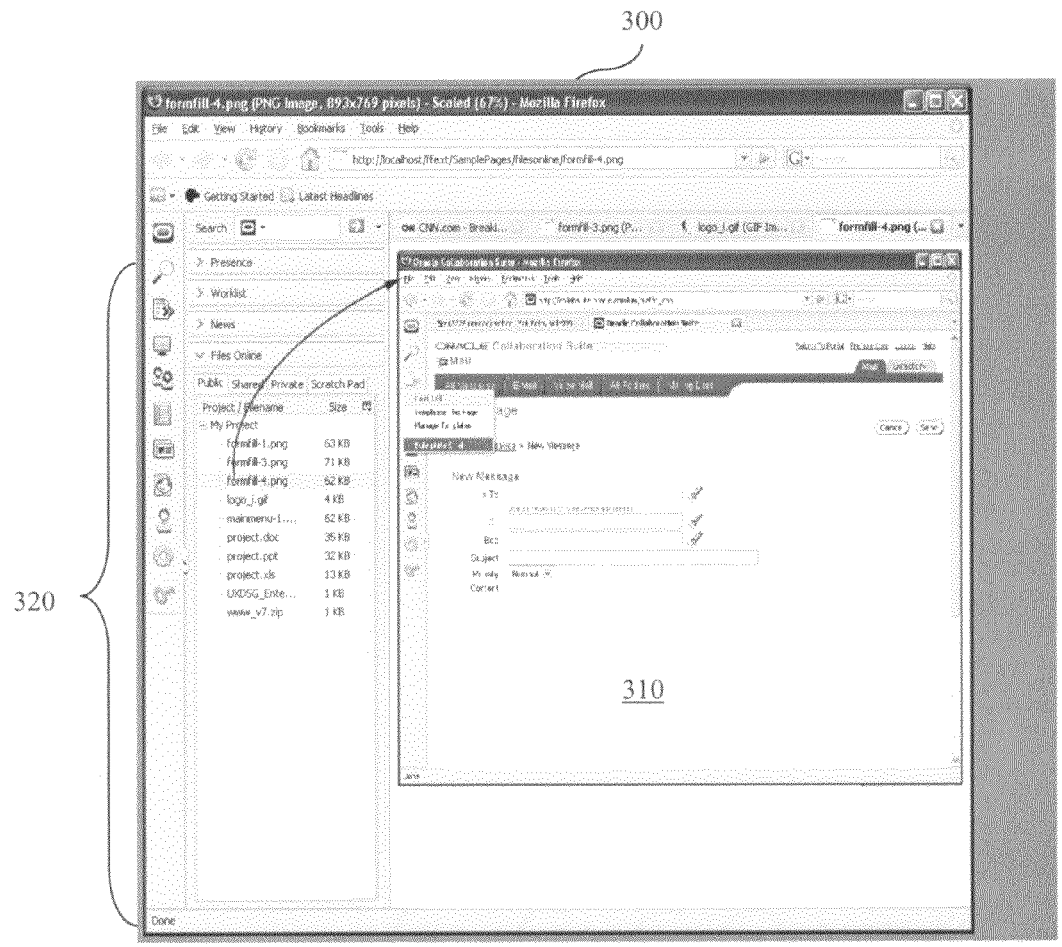
FIG. 3 is a simulated screen shot of a browser window illustrating the launching of remote content within a web browser.
Figure 5:
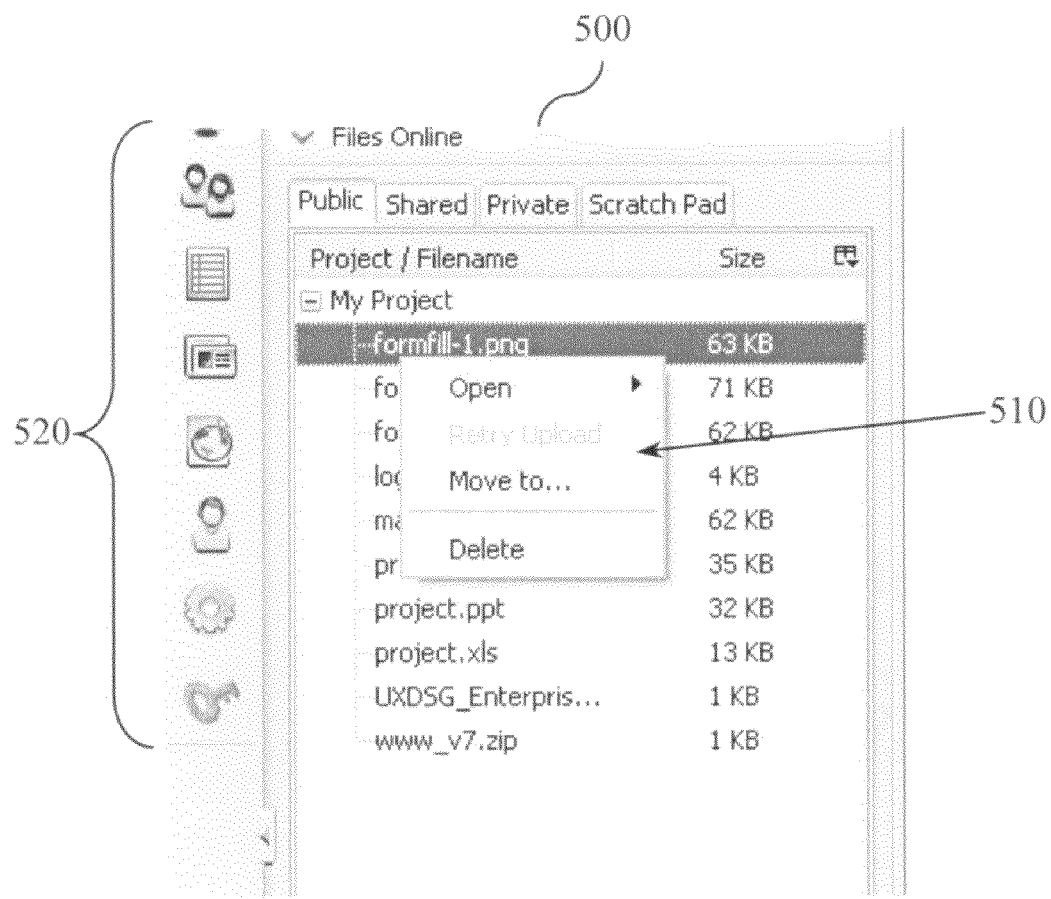
FIG. 5 is a simulated screen shot of a menu of actions related to an uploaded file.

FIG. 5 illustrates a simulated screen shot 500 of a browser window that includes a sidebar 520 from which a client-side stub has been revealed. The stub includes a menu 510 associated with a set of actions available for a successfully uploaded file. One action may be to open the uploaded file using an enterprise application located on the computing device to which the file was uploaded. Thus, FIG. 3 illustrates a simulated screen shot 300 having a sidebar 320 from which a client side stub has been revealed. An uploaded file has been selected and thus window 310 displays file content as processed by, for example, an enterprise application running on the computing device to which the file was uploaded.

Destination file systems, folders, files, and devices may not be static. Therefore, in one embodiment, file tree information associated with the files online pane may be periodically refreshed to facilitate displaying a current tree representation of the target online file system. For example, the state of the online file system may be changed by other users by adding/moving/deleting folders, uploading new files, adding/moving/deleting files, devices coming online, devices going offline, and so on.

In one embodiment, the browser extension may signal a back end (e.g., server based) process that controls and/or performs the upload to the server. The signal may be sent in response to detecting the drop event. Upon receiving the signal, identifying information (e.g. file codes) associated with the item to be uploaded and identifying information associated with the receiving location may be provided to the back-end service that controls the upload on the server side. In one embodiment, the back-end service may place uploaded information in a temporary area (e.g., temporary directory, temporary folder, temporary virtual device) until the file upload is complete. Once successfully uploaded, the back-end service may then transfer the uploaded file to the ultimate target location. In one embodiment, uploads may occur asynchronously. Thus, a second upload may be initiated while a first upload is in progress.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software in execution, and/or a combination thereof. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device can read.

"Logic", as used herein, includes but is not limited to hardware, firmware, software in execution on a computing device, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms (e.g., routines, modules, methods, threads, programs) including separate applications or code from libraries (e.g., dynamically linked library (DLL)). Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated that computer-readable and/or executable instructions can be located in one logic and/or distributed between two or more communicating, co-operating, and/or parallel processing logics and thus may be loaded and/or executed in serial, parallel, massively parallel and other manners.

"User", as used herein, includes but is not limited to one or more persons, software components, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms like processing, transmitting, retrieving, communicating, calculating, determining, displaying, and so on, refer to actions and processes of a computer system, logic, processor, or similar electronic device that manipulates and transforms data represented as physical (electronic) quantities.

Figure 6:
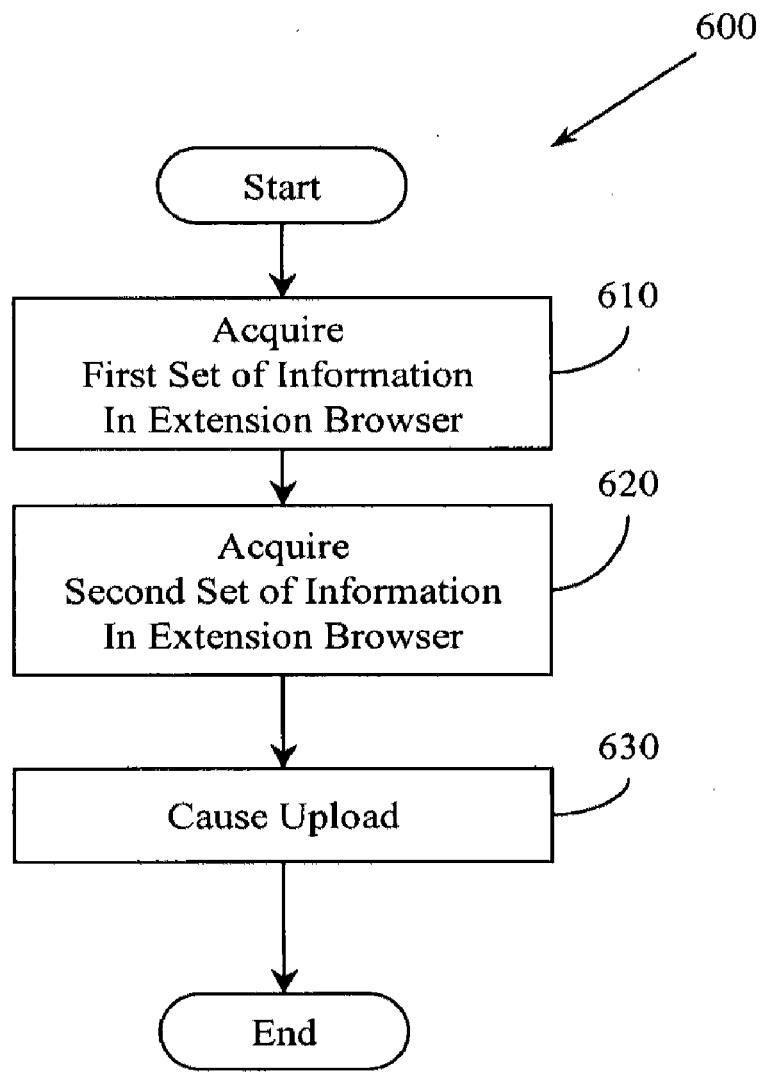
FIG. 6 illustrates an example method associated with a drag and drop upload feature provided by a browser extension.

FIG. 6 illustrates a method 600 associated with a drag and drop upload feature provided by a browser extension that is operably connected to a browser. In one example the browser may be displaying output from an enterprise application running on a remote computing device (e.g., server). Method 600 may include, at 610, acquiring a first set of information that uniquely identifies a first item stored on a first computing device. The first item may be, for example, a file identifier, a GUID, a file handle, and so on. The information may be acquired by the browser extension. The first set of information may be acquired by the browser extension in response to the first item being dragged from a first graphical user interface (GUI) element (e.g., window) associated with a browser running on the first computing device (e.g., local device). In one example, the first GUI element may be a window that displays a set of items available to be uploaded. In this example, the window may be managed, at least in part, by the browser. While a window and a file are described, it is to be appreciated that other GUI elements may display other items available to be uploaded.

Method 600 may also include, at 620, acquiring a second set of information that uniquely identifies a desired upload location associated with a second computing device (e.g., server). Once again the second set of information may be acquired by the browser extension. The second set of information may be acquired in response to the first item being dropped on a second GUI element that represents the desired upload location. The second GUI element may be, for example, a window pane that is managed, at least in part, by the browser extension. The window pane may, in one example, be associated with a sidebar. The window pane may display a set of available upload locations. The available upload locations may be represented as a hierarchical tree structure. Since the available upload locations may change over time the window pane may be periodically refreshed and/or refreshed upon detecting a change.

Method 600 may also include, at 630, causing the first item to be uploaded to the desired upload location. The upload may be achieved by controlling the browser extension to provide information and a control signal to an upload process. In one example, the information may include the first set of information and the second set of information. In one example, the upload process may reside on the second computing device.

Method 600 may also include displaying a GUI element status bar that provides information concerning the progress of an upload. In one example, upon determining that the uploaded item has been uploaded successfully, method 600 may include providing a GUI menu of actions available to be performed on an uploaded item. In one example, the upload process may upload a copy of the first item to a temporary location on the second computing device. In this example, the copy of the first item may then be transferred to the desired upload location upon determining that the copy of the first item has been uploaded successfully.

Figure 7:
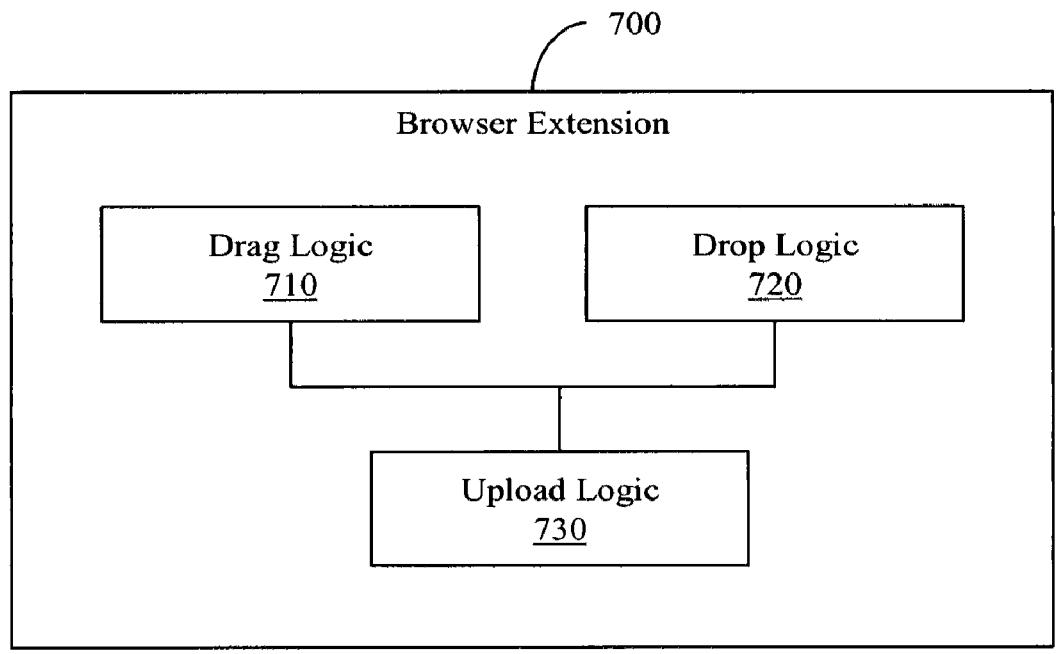
FIG. 7 illustrates an example browser extension associated with a drag and drop upload feature.

FIG. 7 illustrates an example browser extension 700. Browser extension 700 may include, for example, a drag logic 710 to identify a local item to be uploaded to a remote destination. The local item may be, for example, a file, a folder, an object, the contents of a device (e.g., disk), and so on. The local item may be stored on a local computing device that is running a browser to which the browser extension is operably connected. The drag logic 710 may identify the local item in response to the local item being dragged from a first graphical user interface (GUI) element associated with the browser. In one example, the browser extension 700 is implemented in software and incorporated into the browser.

Browser extension 700 may also include a drop logic 720 to identify the remote destination to which the local item is to be uploaded. The remote destination may be on a remote computing device with which the browser is in data communication. In one example, the remote computing device may belong to an enterprise and may be running an enterprise application. The enterprise application may have at least a portion of its output displayed by the browser. The browser may be operably connected to the browser extension 700 and to other browser extensions (e.g., toolbar/sidebar combination) as well. The drop logic 720 may identify the remote destination in response to the local item being dropped on a second GUI element associated with the browser. In one example the second GUI element is a window pane managed, at least in part, by the browser extension. The window pane may, for example, be associated with a sidebar that is managed, at least in part, by the browser extension. In one example, the window pane displays a hierarchical tree structure of storage locations that are available on the remote computing device. Since the available locations may change, the window pane may be refreshed in response to a change in the available storage locations on the remote computing device and/or may simply be refreshed periodically.

The browser extension 700 may also include an upload logic 730 to control the transfer of the local item to the remote destination. Upload logic 730 may control the transfer upon detecting that the local item has been dragged from the first GUI element and has been dropped on the second GUI element. In one example, the drag logic 710 may acquire uniquely identifying information (e.g., file descriptor, GUID) about the local item in response to the local item being dropped on the second GUI element. Similarly, the drop logic may acquire uniquely identifying information (e.g., device id) about the remote destination in response to the local item being dropped on the second GUI element.

In one example, the upload logic 730 controls a transfer logic to upload the local item to the remote computing device. The transfer logic may reside on the remote computing device to which the local item is uploaded. In one example, the upload logic 730 controls the transfer logic to upload a copy of the local item to a temporary location on the remote computing device and only after determining that the upload has completed successfully will the upload logic 730 cause a copy of the local item to be transferred from the temporary location to the remote destination. The upload logic 730 may also provide information about the status of an upload. For example, the upload logic 730 may control the browser to display a status bar that provides information concerning upload progress.

Figure 8:
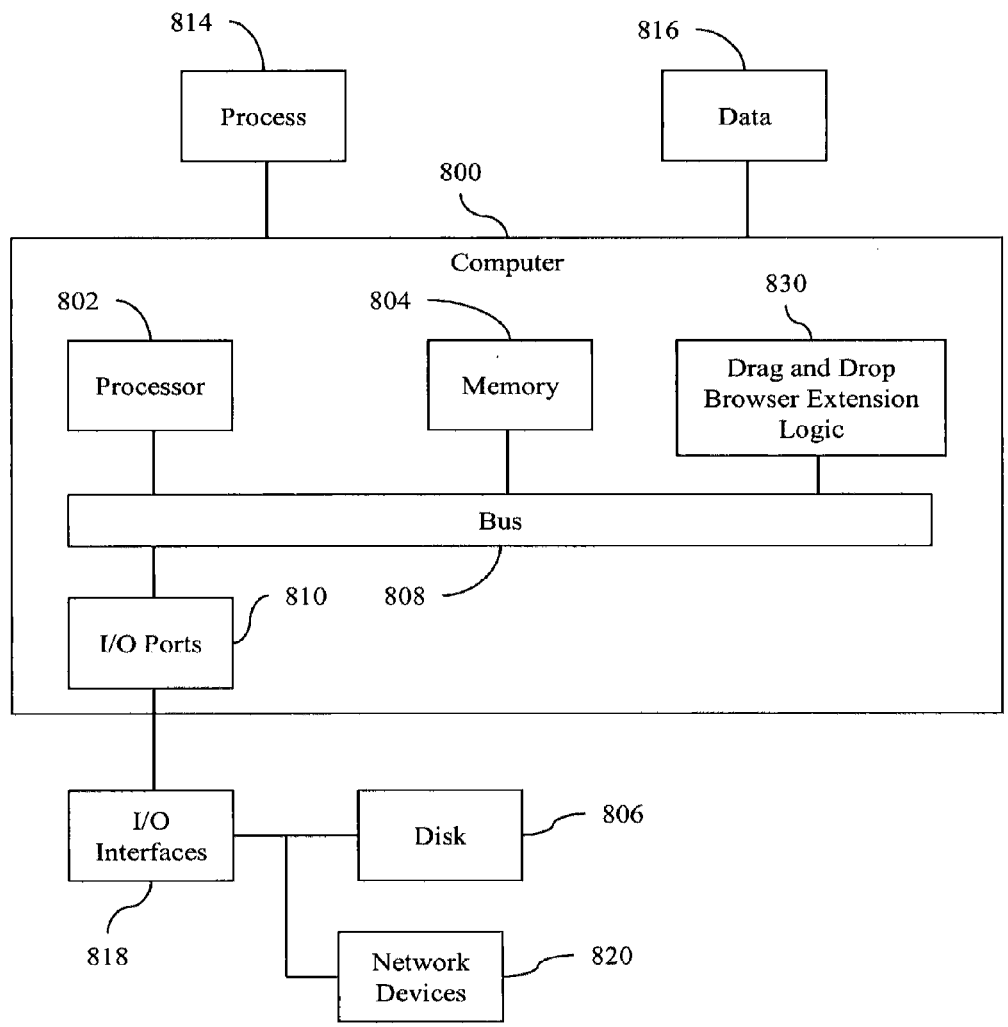
FIG. 8 illustrates an example computing device in which example systems and/or methods may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a drag and drop browser extension logic 830 configured to facilitate adding single gesture upload functionality to a browser. In different examples, the logic 830 may be implemented in hardware, software, firmware, and/or combinations thereof. Thus, the logic 830 may provide means (e.g., hardware, software, firmware) for identifying an item to be uploaded from a first computing device. The first computing device may be running a browser that is operably connected to a browser extension that provides at least a portion of the single action local to remote upload functionality. Logic 830 may also provide means (e.g., hardware, software, firmware) for identifying an upload destination for the item. The upload destination will be on a second computing device that is in data communication with the browser. In one example, the second computing device may run an enterprise application whose output is displayed by the browser on the first computing device. Logic 830 may also provide means (e.g., hardware, software, firmware) for uploading the item from the first computing device to the upload destination in response to a single user gesture involving the browser. This single user gesture (e.g., drag and drop) causes a signal and data to be provided to the browser extension. The data describes the item to be uploaded and the upload destination and the signal is a control signal. While the logic 830 is illustrated as a hardware component attached to the bus 808, it is to be appreciated that in one example, the logic 830 could be implemented in the processor 802.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, and/or a memory stick. Furthermore, the disk 806 may be a CD-ROM (compact disk ROM), a CD recordable drive (CD-R drive), a CD rewritable drive (CD-RW drive), and/or a digital video ROM drive (DVD ROM). The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., USB (universal serial bus), Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a local area network (LAN), a wide area network (WAN), and other networks.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium having stored thereon instructions of a browser extension, comprising:
    a drag logic configured to identify a local item to be uploaded to a remote destination, the local item being stored on a local computing device running a browser to which the browser extension is operably connected, the local item being identified in response to being dragged from a first graphical user interface (GUI) element associated with the browser;
    a drop logic configured to identify the remote destination to which the local item is to be uploaded, the remote destination being on a remote computing device with which the browser is in data communication, the remote destination being identified in response to the local item being dropped on a second GUI element associated with the browser, where the drag logic is configured to acquire a global identifier for the local item in response to the local item being dropped on the second GUI element, and where the global identifier is unique between a group of devices that includes the local computing device and the remote destination;
    an upload logic configured to control the transfer of the local item to the remote destination in response to the local item being dragged from the first GUI element and dropped on the second GUI element in a single user gesture involving the browser and where the upload logic is configured to process multiple asynchronous uploads that are initiated in separate drag and drop requests while at least one previous upload is in progress, where the upload logic is configured to control the browser to display a status bar that provides information concerning progress of the transfer of the local item; and
    a GUI menu configured to provide actions to perform on the local item on completion of the transfer of the local item to the remote destination, where the actions include actions configured to cause an enterprise application on the remote destination to process the local item.

2. The non-transitory computer-readable medium of claim 1, where the browser extension is implemented in executable software stored in the non-transitory computer-readable medium and incorporated into the browser and where the drag logic is configured to use the global identifier to prevent file handle conflicts.

3. The non-transitory computer-readable medium of claim 1, where the remote destination is located on a server machine running an enterprise application that generates an output and wherein the browser is configured to display the output.

4. The non-transitory computer-readable medium of claim 1, where the second GUI element is a window pane managed, at least in part, by the browser extension.

5. The non-transitory computer-readable medium of claim 4, where the window pane is associated with a sidebar that is managed, at least in part, by the browser extension.

6. The non-transitory computer-readable medium of claim 5, where the browser extension is configured to cause the window pane to display a hierarchical tree structure of available storage locations on the remote computing device.

7. The non-transitory computer-readable medium of claim 6, where the browser extension is configured to cause the window pane to be refreshed in response to a change in the available storage locations on the remote computing device.

8. The non-transitory computer-readable medium of claim 1, where the upload logic controls the transfer of the local item to the remote destination automatically in response to the local item being dropped on the second GUI element.

9. The non-transitory computer-readable medium of claim 1, where the drop logic is configured to acquire uniquely identifying information about the remote destination in response to the local item being dropped on the second GUI element.

10. The non-transitory computer-readable medium of claim 1, where the upload logic is configured to control a transfer logic to upload the local item to the remote computing device.

11. The non-transitory computer-readable medium of claim 10, where the upload logic is configured to control the transfer logic to upload a copy of the local item to a temporary location on the remote computing device, and, upon determining that the upload has completed successfully, to transfer the copy of the local item to the remote destination.

12. The non-transitory computer-readable medium of claim 1, where the upload logic being configured to process multiple asynchronous uploads includes being configured to initiate a second upload while a first upload is in progress in response to a second item being dropped on the second GUI element, and being configured to process multiple upload requests asynchronously.

13. A computing device with at least one processor, the computing device comprising:
non-transitory computer-readable medium that stores instructions that when executed by the computing device cause the computing device to perform a method, the method comprising:
identifying an item to be uploaded from a first computing device running a browser that is operably connected to a browser extension where identifying the item includes identifying a global identifier for the item that is unique between a group of devices that includes the first computing device and a second computing device, where the item is identified in response to being dragged from a first graphical user interface (GUI) element associated with the browser;
identifying an upload destination for the item, the upload destination being on the second computing device that is in data communication with the browser, where the upload destination is identified in response to the item being dropped on a second GUI element associated with the browser;
automatically uploading the item from the first computing device to the upload destination on the second computing device in response to a single user gesture involving the browser, where the single user gesture causes a signal and data to be provided to the browser extension, where the data describes the item to be uploaded and the upload destination, and where the uploading includes processing multiple asynchronous uploads that are initiated in separate drag and drop requests while at least one previous upload is in progress;
providing a GUI menu of actions on completion of the transfer of the item to the second computing device, and where the GUI menu of actions include actions to cause an enterprise application on the second computing device to process the item; and
displaying a status bar that provides information concerning progress of each item being uploaded.

14. A computer-implemented method, comprising:
acquiring in a browser extension a first set of information that uniquely identifies a first item stored on a first computing device, the first set of information being acquired in response to the first item being dragged from a first graphical user interface (GUI) element associated with a browser running on the first computing device, the browser being operably connected to the browser extension and where the first set of information includes a global identifier that is unique between a group of devices that includes the first computing device and a second computing device;
acquiring in the browser extension a second set of information that uniquely identifies a desired upload location associated with the second computing device, the second set of information being acquired in response to the first item being dropped on a second GUI element that represents the desired upload location, the second GUI element being managed, at least in part, by the browser extension;
causing the first item to be automatically uploaded to the desired upload location by controlling the browser extension to provide the first set of information, the second set of information, and a control signal, to an upload process residing on the second computing device in response to a single user gesture involving the browser;
providing a GUI menu of actions to perform on the first item including a retry option for restarting upload of the first item when an error occurs, where the retry option uses at least the first set of information to restart uploading, where providing the GUI menu of actions includes providing additional actions on completion of the transfer of the first item to the second computing device, and where the additional actions include actions to cause an enterprise application on the second computing device to process the first item; and
displaying a status bar that provides information concerning progress of the automatic upload of the first item.

15. The method of claim 14, where the first GUI element is a window that displays a set of items available to be uploaded, the window being managed, at least in part, by the browser.

16. The method of claim 15, where the second GUI element is a window pane that displays a set of available upload locations.

17. The method of claim 16, including displaying a GUI element status bar that provides information concerning the progress of an upload.

18. The method of claim 14, where the GUI menu of actions provides different options based, at least in part, on a status of the upload.

19. The method of claim 14, where a copy of the first item is to be uploaded to a temporary location on the second computing device and, upon determining that the copy of the first item has been uploaded successfully, the copy of the first item is then to be transferred to the desired upload location.

* * * * *

UNITED STATES PATENT AND TRADEMARK OFFICE
CERTIFICATE OF CORRECTION

PATENT NO. : 8,209,622 B2
APPLICATION NO. : 11/978874
DATED : June 26, 2012
INVENTOR(S) : Selig It is certified that error appears in the above-identified patent and that said Letters Patent is hereby corrected as shown below:

On the Title page, Item (73), under "Assignee", line 2, delete "Shore," and insert -- Shores, --, therefor.

In column 6, line 23, delete "servelet," and insert -- servlet, --, therefor.

Signed and Sealed this
Twenty-fifth Day of September, 2012

David J. Kappos
*Director of the United States Patent and Trademark Office*